(12) United States Patent (10) Patent No.: US 8,330,375 B2
Matsui et al. (45) Date of Patent: Dec. 11, 2012

(54) VEHICLE LAMP LIGHTING CONTROL DEVICE

(75) Inventors: Kotaro Matsui, Shizuoka (JP); Takao Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 263 days.

(21) Appl. No.: 12/758,885

(22) Filed: Apr. 13, 2010

(65) Prior Publication Data

US 2010/0270926 A1 Oct. 28, 2010

(30) Foreign Application Priority Data

Apr. 23, 2009 (JP) ................................. 2009-105545

(51) Int. Cl.
*B60Q 1/26* (2006.01)
*B60Q 1/14* (2006.01)
(52) U.S. Cl. ......................................... 315/80; 315/77
(58) Field of Classification Search .............. 315/76–80, 315/82, 83, 84, 91, 92, 291, 307
See application file for complete search history.

(56) References Cited

U.S. PATENT DOCUMENTS

| | | | |
|---|---|---|---|
| 7,023,145 B2* | 4/2006 | Hwang et al. | 315/276 |
| 7,964,987 B2* | 6/2011 | Isobe et al. | 307/10.8 |
| 7,999,478 B2* | 8/2011 | Noyori et al. | 315/77 |
| 2009/0026977 A1* | 1/2009 | Omi | 315/294 |

FOREIGN PATENT DOCUMENTS

JP 2004-122912 4/2004

* cited by examiner

*Primary Examiner* — Minh D A
(74) *Attorney, Agent, or Firm* — Fish & Richardson P.C.

(57) ABSTRACT

A vehicle lamp lighting control device includes: a current control unit which is of a non-insulation type and supplies a supply current to a semiconductor light source; an abnormality detecting unit which detects abnormality of a positive-electrode-side output based on at least one of a power supply voltage or a supply voltage supplied to the semiconductor light source, and outputs signal indicating the abnormality; and a bypass unit which bypasses the supply current supplied from the current control unit in accordance with the signal indicating the abnormality.

5 Claims, 5 Drawing Sheets

VEHICLE LAMP LIGHTING CONTROL DEVICE

This application claims priority from Japanese Patent Application No. 2009-105545, filed on Apr. 23, 2009, the entire contents of which are incorporated by reference herein.

BACKGROUND

1. Technical Field

The present disclosure relates to a vehicle lamp lighting control device and particularly to a vehicle lamp lighting control device that controls a lighting operation of a semiconductor light source including a semiconductor light emitting element.

2. Related Art

A known vehicle lamp incorporates a semiconductor light emitting element such as an LED (Light Emitting Diode) as a semiconductor light source. This kind of vehicle lamp is equipped with a lighting control device that controls a lighting operation of the LED.

This kind of lighting control device has a current limiting circuit to protect the semiconductor light source when a large current pulse (load dump) flows from an in-vehicle battery to the semiconductor light source upon starting the vehicle (see, e.g., JP-A-2004-122912).

For implementations in which a power supply voltage supplied to a resistor connected in series to the semiconductor light source is equal to or more than a predetermined voltage, the current limiting circuit decreases a current flowing to the resistor. Accordingly, when an overvoltage caused by a dump surge or the like is applied to the lighting control device, the current flowing from the positive electrode of the power supply to the resistor decreases, to prevent damage to the semiconductor light source.

As described above, in the known vehicle lamp, it is possible to prevent damage to the semiconductor light source as a result of an overvoltage by using the current limiting circuit.

However, if the positive electrode of the power supply is in a ground fault condition, a battery voltage is short-circuited to GND (ground), so that a large ground fault current flows from the positive electrode to ground. As a result, the lighting control device may be damaged.

SUMMARY

Exemplary embodiments of the present invention address the foregoing disadvantages as well as other disadvantages not described above. However, the present invention is not required to overcome the disadvantages described above and, thus, some implementations of the present invention may not overcome any disadvantages described above.

Some implementations of the invention improve the safety of a vehicle in a traveling mode by preventing the large ground fault current from flowing from the positive electrode to the ground when the positive electrode of the power supply is in the ground fault condition.

According to an illustrative aspect of the present invention, a vehicle lamp lighting control device includes: a current control unit of a non-insulation type that supplies a supply current to a semiconductor light source; an abnormality detecting unit which detects abnormality of a positive-electrode-side output (based on at least one of a power supply voltage and a supply voltage supplied to the semiconductor light source), and outputs signal indicating an abnormality; and a bypass unit which bypasses the supply current supplied from the current control unit in accordance with the signal indicating the abnormality.

In some implementations of the present invention, since the supply current supplied to the semiconductor light source is bypassed when an abnormality is detected, the current value of the driving current at the output side of the bypass unit becomes small.

Also, in some implementations of the present invention, since the supply current is bypassed when an abnormality of the positive-electrode-side output of the current control unit is detected, it is possible to prevent a large current from flowing from the positive electrode. It is, thus, possible to improve the safety of the vehicle in a traveling mode.

According to one or more illustrative aspects of the present invention, the bypass unit comprises: a first resistor connected in series to the semiconductor light source, and a switch connected in parallel to the first resistor. The abnormality detecting unit comprises: a first switch element which turns off the switch when the abnormality is detected. Accordingly, it is possible to turn off the switch reliably so that the supply current flows to the first resistor in the event of the abnormality.

According to one or more illustrative aspects of the present invention, the abnormality detecting unit includes an overvoltage detecting unit which detects an overvoltage of the power supply voltage, and the abnormality detecting unit turns off the switch when the overvoltage detecting unit detects the overvoltage. Accordingly, it is possible to prevent an overvoltage from being applied to the semiconductor light source when the switch is turned on in the case of the normal operation.

According to one or more illustrative aspects of the present invention, the abnormality detecting unit includes a supply voltage detecting unit which detects a decrease in the supply voltage, and the abnormality detecting unit turns off the switch when the supply voltage detecting unit detects a decrease in the supply voltage. Accordingly, it is possible to detect the ground fault of the positive-electrode-side output of the current control unit and the short-circuit abnormality of the negative-electrode-side output thereof. Accordingly, since it is possible to prevent a large current from flowing from the positive electrode to ground when the supply voltage to the semiconductor light source becomes abnormal, it is possible to improve the safety of the vehicle in a vehicle traveling mode.

According to one or more illustrative aspects of the present invention, the abnormality detecting unit includes a second switch element which stops a voltage supply to the semiconductor light source at the same time when the switch is turned off. Accordingly, since the current control unit starts to be driven at the same time when the abnormal condition returns to the normal condition or the switch is turned on, it is possible to prevent a large current from flowing to the semiconductor light source when the switch is turned on.

Other aspects and advantages of the present invention will be apparent from the following description, the drawings and the claims.

DETAILED DESCRIPTION OF EXEMPLARY EMBODIMENTS

A vehicle lamp lighting control device according to a first embodiment of the invention is described in the following paragraphs.

Figure 1:
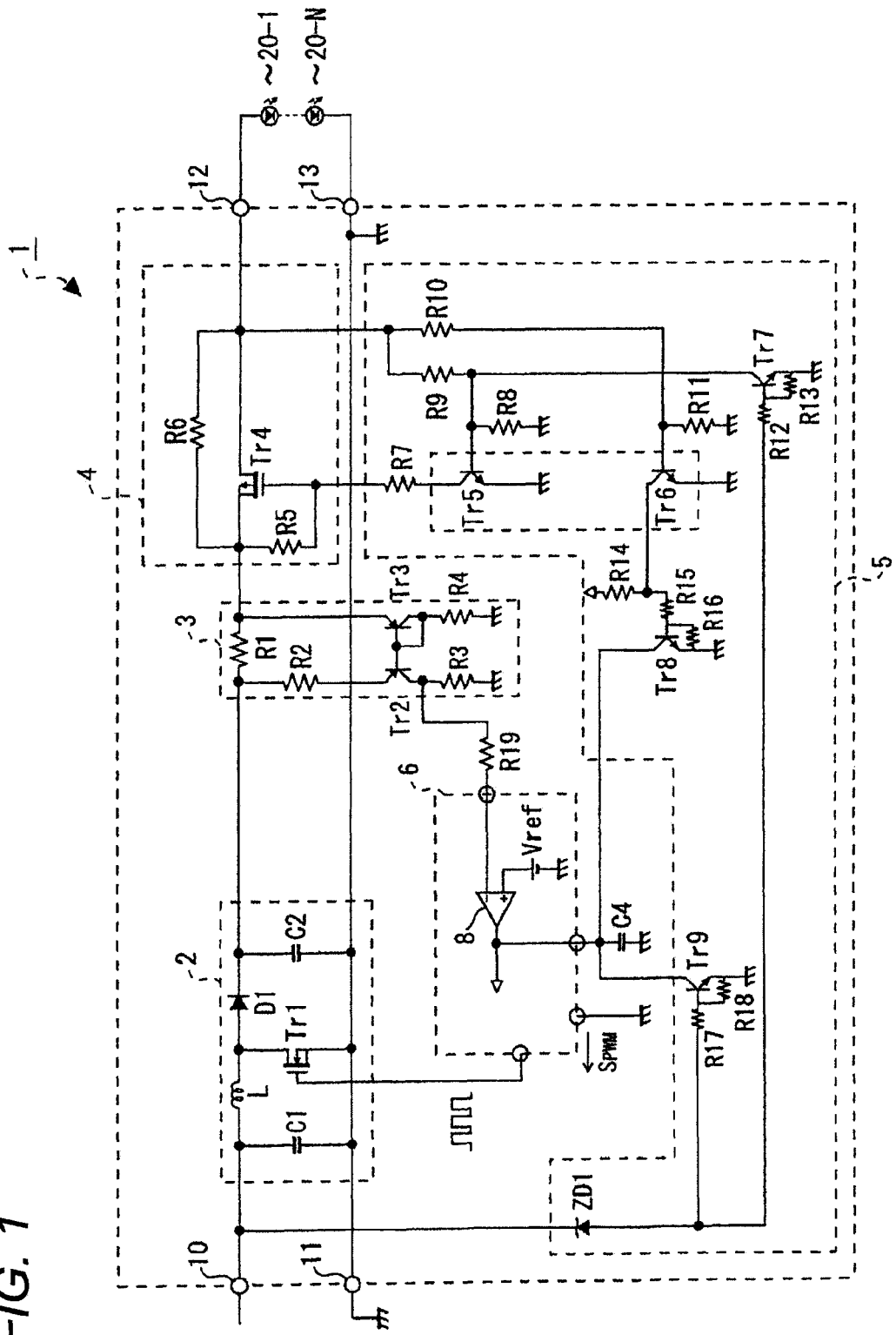
FIG. 1 illustrates a configuration of a vehicle lamp lighting control device according to a first embodiment of the invention.

As shown in FIG. 1, a lighting control device 1 includes: a boost chopper circuit (e.g., non-insulated converter) 2 as a non-insulated current control unit which supplies a supply current (also referred to as a "driving current") to LEDs 20-1 to 20-N (N is an integer equal to or more than two) as semiconductor light sources; a current detecting unit 3; a bypass unit 4; an abnormality detecting unit 5; and a PWM signal generating unit 6 which generates a PWM signal $S_{PWM}$ for controlling a driving operation of the boost chopper circuit 2. In addition, the lighting control device 1 includes a positive-electrode-side input terminal 10, a ground-side input terminal 11, a positive-electrode-side output terminal 12, and a ground-side output terminal 13.

In the illustrated example, the boost chopper circuit 2 includes an NMOS transistor Tr1, condensers C1 and C2, a coil L, and a diode D1. The NMOS transistor Tr1 receives the PWM signal $S_{PWM}$ from the PWM signal generating unit 6 and supplies a positive electrode output to the LEDs 20-1 to 20-N.

The current detecting unit 3 includes a shunt resistor R1, PNP transistors Tr2 and Tr3, and resistors R2 to R4, and detects the driving current supplied to the LEDs 20-1 to 20-N. The emitter and the collector of the PNP transistor Tr2 are connected, respectively, to the resistors R2 and R3, and the collector of the PNP transistor Tr3 is connected to the resistor R4.

The bypass unit 4 includes: a resistor R5; a resistor R6 (a first resistor) one end of which is connected to the shunt resistor R1 and the other end of which is connected to the anodes of the LEDs 20-1 to 20-N; and a PMOS transistor Tr4 (i.e., a switch) connected in parallel to the resistor R6. In addition, the resistance value of the resistor R6 is much larger than that of the resistor R1.

The abnormality detecting unit 5 includes: NPN transistors Tr5, Tr6, and Tr7 which are provided as first switch elements; NPN transistors Tr8 and Tr9 which are provided as second switch elements; resistors R7 to R18; and a zener diode ZD1. The NPN transistor Tr7 and the zener diode ZD1 serve as an overvoltage detecting unit. The NPN transistor Tr5 and the resistors R7 to R10 serve as a supply voltage detecting unit.

The collector of the NPN transistor Tr5 is connected to the gate of the PMOS transistor Tr4 via the resistor R7. The base of the NPN transistor Tr5 is connected to the drain of the PMOS transistor Tr4 and the resistor R6 via the resistor R9, and is connected to the base of the NPN transistor Tr6 via the resistors R9 and R10. The emitter of the NPN transistor Tr5 is electrically grounded.

The collector of the NPN transistor Tr6 is connected to the base of the NPN transistor Tr8 via the resistor R15, and the emitter thereof is electrically grounded.

The base of the NPN transistor Tr7 is connected to the positive-electrode-side input terminal 10 of a battery (not shown) as a power supply unit via the resistor R12 and the zener diode ZD1, the collector thereof is connected to the resistor R6 via the resistor R9, and the emitter thereof is electrically grounded.

The collector of the NPN transistor Tr8 is connected to the collector of the NPN transistor Tr9.

The base of the NPN transistor Tr9 is connected to the positive-electrode-side input terminal 10 of the battery via the resistor R17 and the zener diode ZD1, and the emitter thereof is electrically grounded.

The PWM signal generating unit 6 includes an error amplifier 8 and a PWM signal generating circuit (not shown). The comparison output of the error amplifier 8 is connected to the collectors of the NPN transistors Tr8 and Tr9. The PWM signal output terminal of the PWM signal generating unit 6 is connected to the gate of the NMOS transistor Tr1.

Operation of the lighting control device 1 is described in the following paragraphs.

Figure 2:
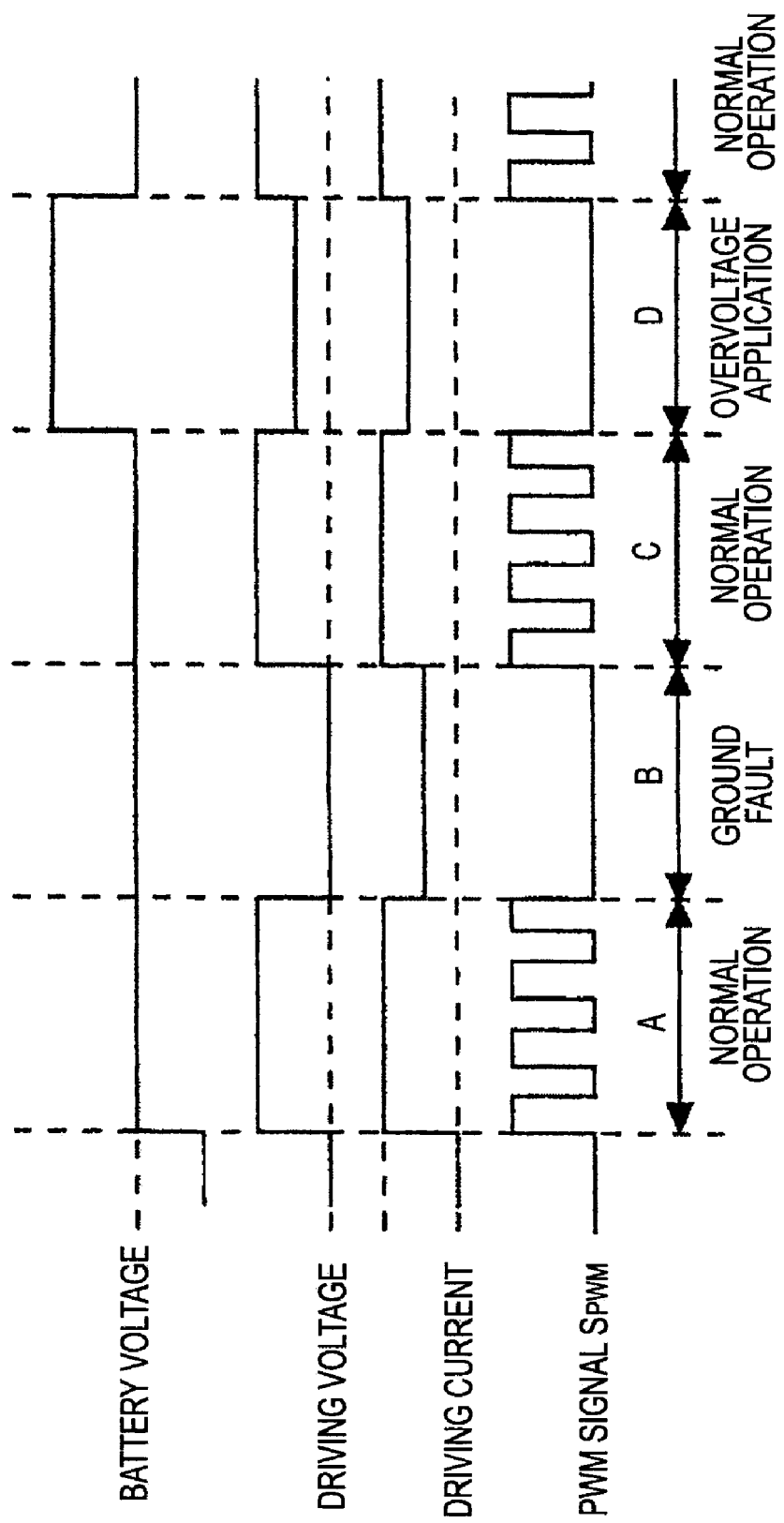
FIG. 2 illustrates timing charts of a battery voltage, a driving voltage, a driving current, and a PWM signal in the cases of a normal operation, a ground fault, and an overvoltage application.

FIG. 2 is a diagram illustrating timing charts of a battery voltage, a driving voltage (a voltage at the output terminal 12), a driving current, and a PWM signal $P_{PWM}$ in cases where the boost chopper circuit 2 is normally operated (also referred to as a "normal operation"), the positive-electrode-side output of the battery is in a ground fault condition (also referred to as a "ground fault"), and an overvoltage equal to or more than a rated forward voltage (Vf) of the LEDs 20-1 to 20-N is applied to the positive electrode of the battery (also referred to as an "overvoltage application"). Sections A and C indicate an example of normal operation, section B indicates an example of the ground fault, and section D indicates an example of the overvoltage application.

In the case of the normal operation, when the battery voltage is applied to the input terminal 10, the driving voltage is supplied to the bases of the NPN transistors Tr5 and Tr6 via the boost chopper circuit 2. Since the NPN transistor Tr5 is turned on, the PMOS transistor Tr4 is also turned on. In addition, since the NPN transistor Tr6 is turned on, the NPN transistor Tr8 is turned off, and the comparison output of the error amplifier 8 is sent to the PWM signal generating circuit. Accordingly, the PWM signal generating circuit receives the comparison output, and sends the PWM signal $P_{PWM}$ to the gate of the NMOS transistor Tr1. The boost chopper circuit 2 generates a predetermined driving voltage by turning on or off the NMOS transistor Tr1 receiving the PWM signal $P_{PWM}$, and the driving current is supplied to the LEDs 20-1 to 20-N via the PMOS transistor Tr4 (refer to section A).

In the case of the ground fault, the driving voltage becomes almost zero volts, and a voltage capable of turning on the NPN transistors Tr5 and Tr6 is not generated in the bases of the NPN transistors Tr5 and Tr6. Then, since the NPN transistor Tr5 is turned off, the PMOS transistor Tr4 is also turned off, and the driving current is in the ground fault condition via the resistor R6. Since the driving current at this time passes through the resistor R6 having a large resistor value, the current value of the driving current becomes small (refer to section B).

In addition, since the NPN transistor Tr6 is turned off and the NPN transistor Tr8 is turned on, the comparison output of the error amplifier 8 becomes low, so that the comparison output is not provided to the PWM signal generating circuit, and the PWM signal $P_{PWM}$ is not provided therefrom (refer to section B). Since there is no operation of turning on or off the NMOS transistor Tr1, the driving operation of the boost chopper circuit 2 stops (refer to section B). In addition, in order to turn off the NPN transistors Tr5 and Tr6 at the same time, the resistor values of the resistors R9 and R10 are set to be identical, and the resistor values of the resistor R8 and R11 are set to be identical.

Subsequently, when the positive-electrode-side output terminal 12 returns from the ground fault condition to the normal condition, the driving voltage is supplied from the boost chopper circuit 2 to the bases of the NPN transistors Tr5 and Tr6 (refer to section C). Since the subsequent operation is the same as that of section A, further description is omitted.

In the case of an overvoltage application caused by a load dump or the like, since the zener diode ZD1 is turned on, a voltage is supplied to the bases of the NPN transistors Tr7 and Tr9. Accordingly, since the NPN transistor Tr7 is turned on and the NPN transistor Tr5 is turned off, the PMOS transistor Tr4 is also turned off, and the driving current is supplied to the LEDs 20-1 to 20-N via the resistor R6. Since the driving current at this time passes through the resistor R6 having a large resistor value, the current value becomes small (refer to section D).

In addition, since the NPN transistor Tr9 is turned on, the comparison output of the error amplifier 8 becomes low, so that the comparison output is not provided to the PWM signal generating circuit, and the PWM signal $P_{PWM}$ is not provided therefrom (refer to section D). Since there is no operation of turning on or off the NMOS transistor Tr1, the driving operation of the boost chopper circuit 2 stops (refer to section D). In addition, in the case of the overvoltage, the driving operation of the boost chopper circuit 2 stops, but a current flows to the LEDs 20-1 to 20-N via the resistor R6, so that the driving current and the output terminal voltage 12 do not completely become zero (refer to section D).

When the battery voltage returns to the normal condition, the NPN transistors Tr7 and Tr9 are turned off, and hence the driving operation of the boost chopper circuit 2 starts at the same time when the PMOS transistor Tr4 is turned on. Subsequent operation is the same as that of section C.

Figure 3:
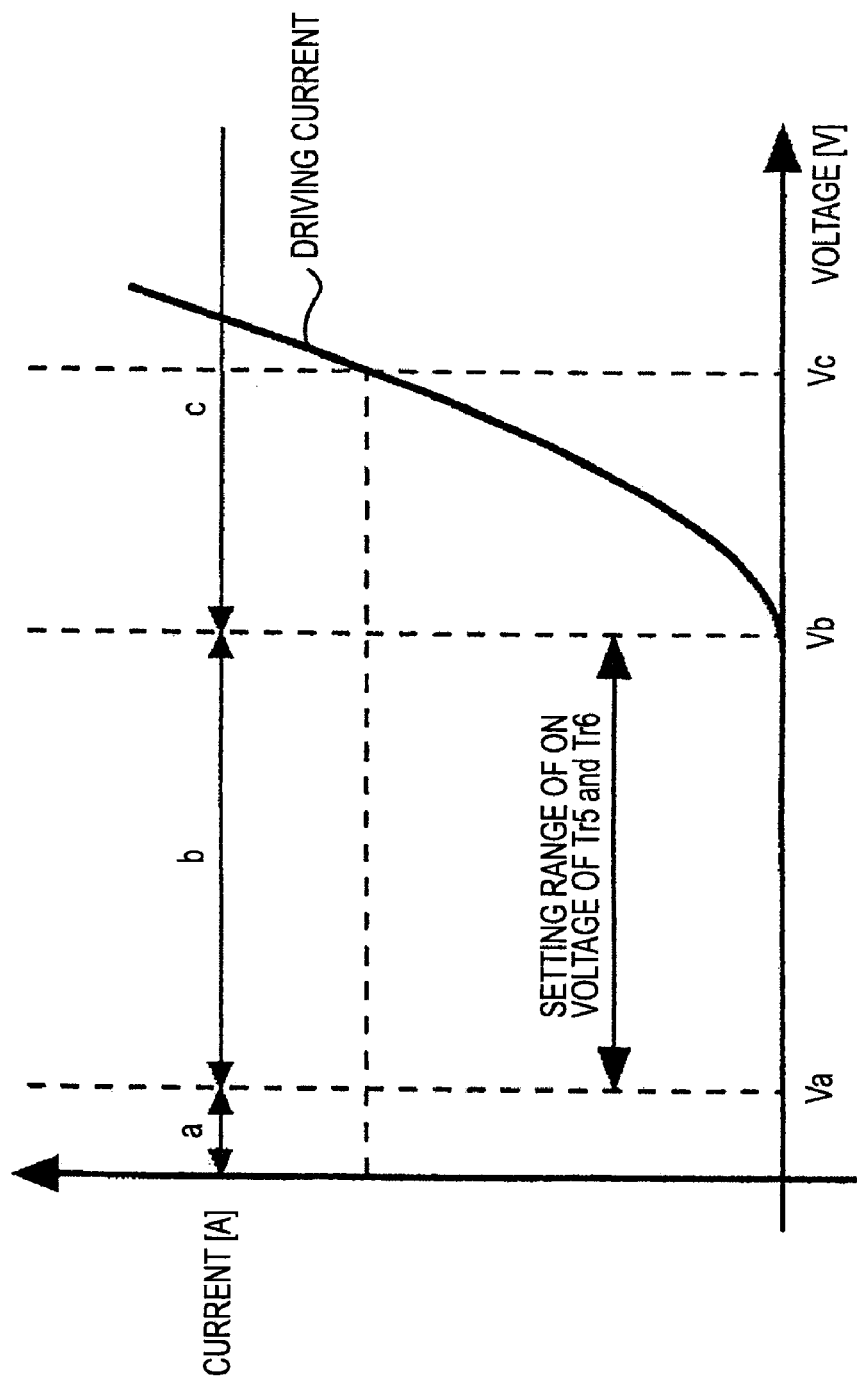
FIG. 3 illustrates a setting range of an ON voltage of a switch element.

Next, the setting range of the ON voltage of the NPN transistors Tr5 and Tr6 is described. FIG. 3 illustrates the setting range (the b region of FIG. 3) of the ON voltages of the NPN transistors Tr5 and Tr6. The ON voltages of the NPN transistors Tr5 and Tr6 are set to be larger than a voltage (Va) of the positive-electrode-side output terminal 12 in the case of the ground fault. The ON voltages of the NPN transistors are also set to be equal to or less than a voltage (Vb) of the positive-electrode-side output terminal 12 where the driving current starts to flow in the case of the normal operation. Vc indicates a voltage of the positive-electrode-side output terminal 12 in the case of the normal operation.

In the case of the normal operation, since the voltage (Vc in the region c of FIG. 3) of the positive-electrode-side output terminal 12 is higher (>Va and ≦Vb) than the ON voltages of the NPN transistors Tr5 and Tr6, the NPN transistors Tr5 and Tr6 are turned on. When the NPN transistor Tr5 is turned on, the PMOS transistor Tr4 is also turned on, so that the driving current flows to the PMOS transistor Tr4 via the shunt resistor R1.

In the case of the ground fault, the voltage (≦Va in the region a of FIG. 3) of the positive-electrode-side output terminal 12 is lower than the ON voltages of the NPN transistors Tr5 and Tr6, so that the NPN transistors Tr5 and Tr6 are turned off. When the NPN transistor Tr5 is turned off, the PMOS transistor Tr4 is also turned off, so that the driving current flows to the resistor R6 via the shunt resistor R1.

When the driving current in the case of the ground fault is set to the ground fault current, the current value of the ground fault current becomes smaller as the value of the resistor R6 becomes larger. Accordingly, it is possible to control the current value of the ground fault current by controlling the value of the resistor R6, and to allow the ground fault current to be smaller than the driving current in the case of the normal operation in accordance with the setting value of the resistor 6.

In addition, since the ON voltages of the NPN transistors Tr5 and Tr6 are set to be larger than the voltage (Va) of the positive-electrode-side output terminal 12 in the case of the ground fault and are also set to be equal to or less than the voltage (Vb) of the positive-electrode-side output terminal 12 where the driving current starts to be supplied, the driving voltage of the boost chopper circuit 2 reliably becomes lower than the ON voltages of the NPN transistors Tr5 and Tr6 in the case of the ground fault. Accordingly, in the case of the ground fault, it is possible to turn off the NPN transistors Tr5 and Tr6 reliably, and thus to turn off the PMOS transistor Tr4.

According to the first embodiment, as described above, when the positive electrode side of the boost chopper circuit 2 is in the ground fault condition, it is possible to allow the ground fault current to be in the ground fault condition via the resistor R6 having a large resistor value by turning off the PMOS transistor Tr4, and to stop the driving operation of the boost chopper circuit 2 by controlling an operation of turning on or off the NMOS transistor Tr1. Accordingly, it is possible to prevent the large ground fault current from flowing from the positive electrode to the ground, and thus to improve the safety of the vehicle in a traveling mode.

In addition, even when the overvoltage is provided via the input terminal 10 of the battery, it is possible to allow a large current based on the overvoltage to pass through the resistor R6 having a large resistor value by turning off the PMOS transistor Tr4, and to stop the driving operation of the boost chopper circuit 2 by controlling an operation of turning on or off the NMOS transistor Tr1. Accordingly, it is possible to prevent a large current from flowing from the positive electrode to the LEDs 20-1 to 20-N, and thus to improve the safety of the vehicle in a traveling mode.

A vehicle lamp lighting control device according to a second embodiment of the invention is now described.

Figure 4:
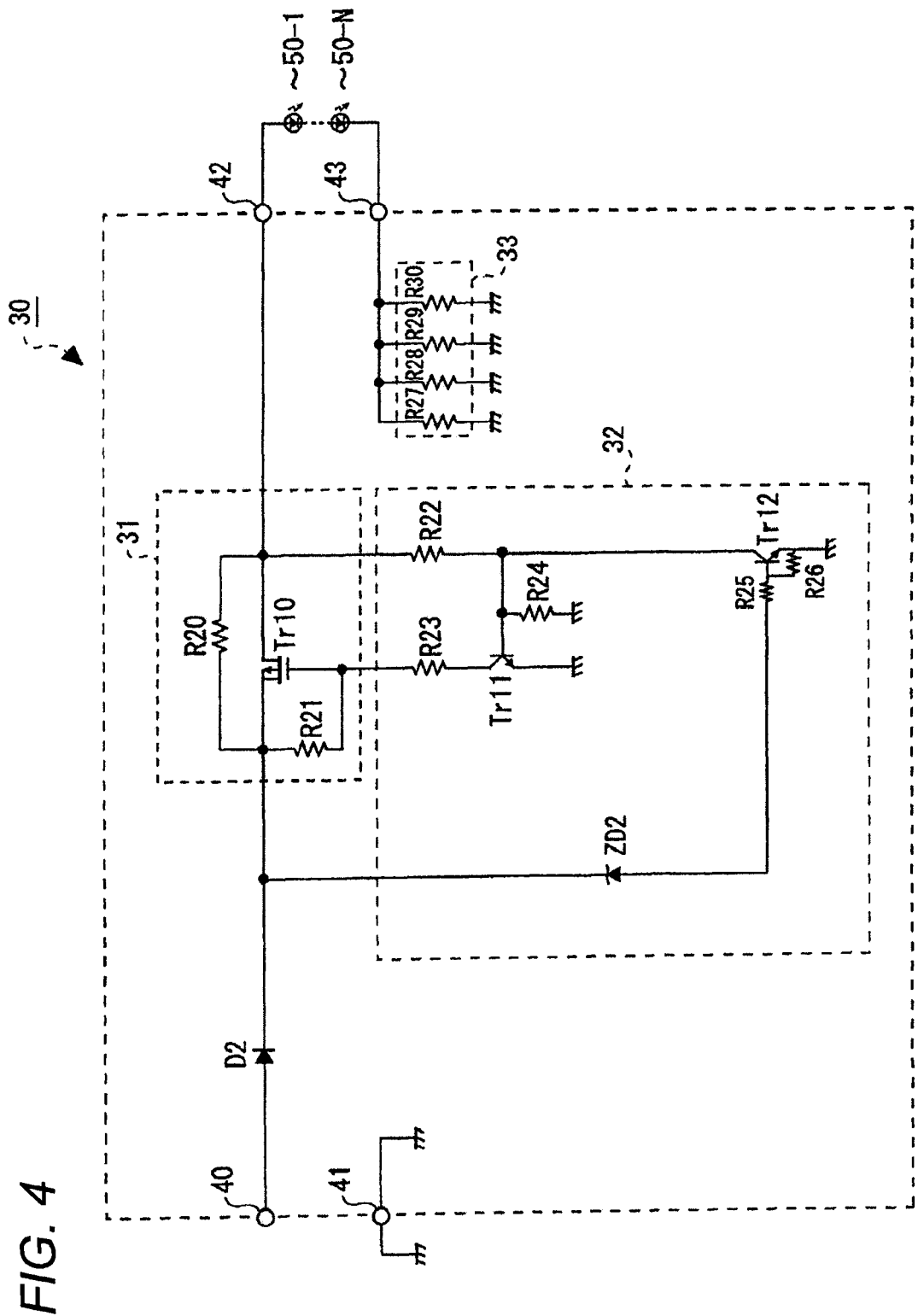
FIG. 4 illustrates a configuration of a vehicle lamp lighting control device according to a second embodiment of the invention.

As shown in FIG. 4, a lighting control device 30 includes a reverse connection protecting diode D2, a bypass unit 31, an abnormality detecting unit 32, and a driving current setting unit 33.

The bypass unit 31 includes: a resistor R20 connected in series to a battery (not shown) as a power supply unit for supplying a driving voltage to LEDs 50-1 to 50-N (N is an integer equal to or more than two) as semiconductor light sources; and a PMOS transistor Tr10 as a switch connected in parallel to the resistor R20. The resistor value of the resistor R20 is larger than the resistor values of other resistors.

The abnormality detecting unit 32 includes: an NPN transistor Tr11 as a first switching element; an NPN transistor Tr12; resistors R22 to R26; and a zener diode ZD2. The NPN transistor Tr12 and the zener diode ZD2 serve as an overvoltage detecting unit. The NPN transistor Tr11 and the resistors R22 to R24 serve as a supply voltage detecting unit.

The collector of the NPN transistor Tr11 is connected to the gate of the PMOS transistor Tr10 via the resistor R23. The base of the NPN transistor Tr11 is connected to the drain of the PMOS transistor Tr10 and the resistor R20 via the resistor R22. The emitter of the NPN transistor Tr11 is electrically grounded.

The base of the NPN transistor Tr12 is connected to a positive-electrode-side input terminal 40 of the battery via the resistor R25, the zener diode ZD2, and the diode D2, the collector thereof is connected to the drain of the PMOS transistor Tr10 and the resistor R20 via the resistor R22, and the emitter thereof is electrically grounded.

The driving current setting unit 33 includes resistors R27 to R30, and sets the values of the driving currents supplied to the LEDs 50-1 to 50-N.

Operation of the lighting control device 30 is described in the following paragraphs.

Figure 5:
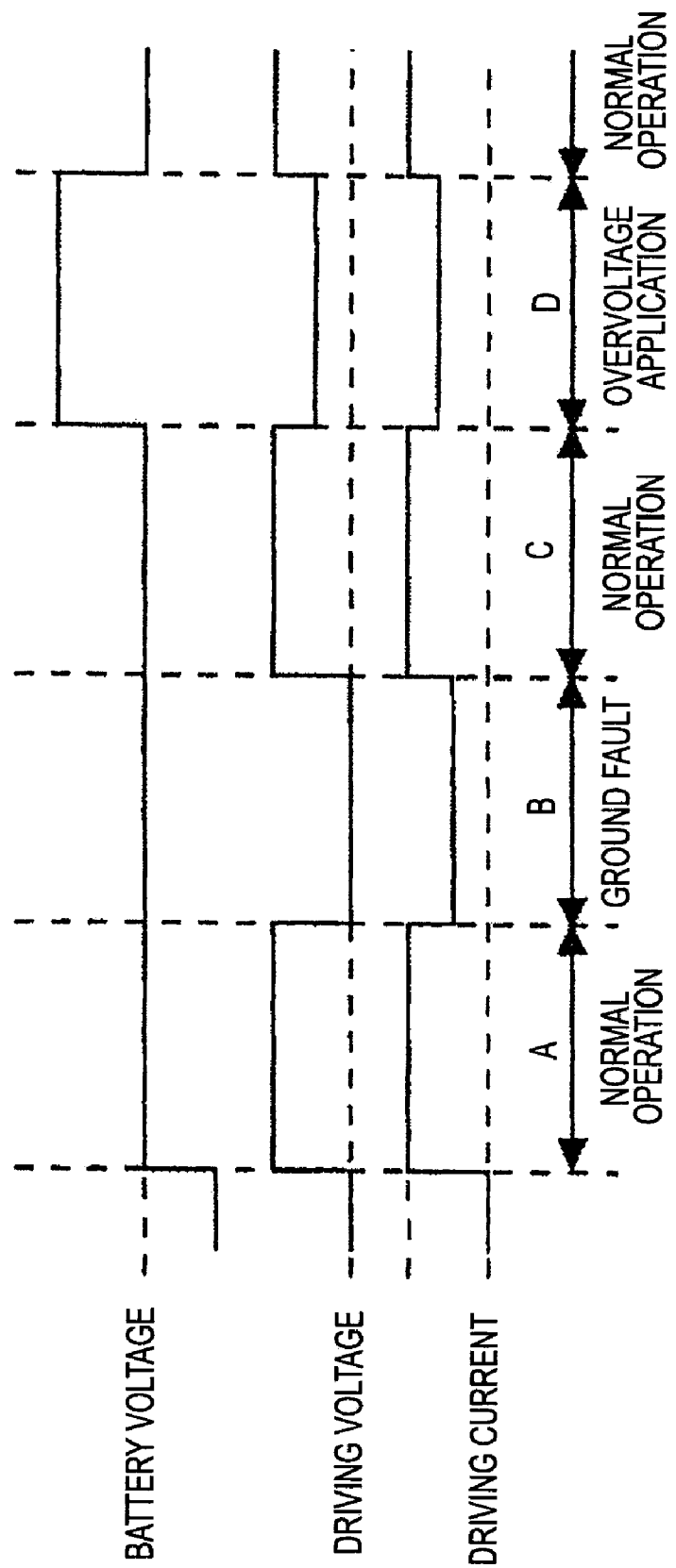
FIG. 5 illustrates timing charts of a battery voltage, a driving voltage, and a driving current in the cases of a normal operation, a ground fault, and an overvoltage application.

FIG. 5 illustrates timing charts of a battery voltage, a driving voltage (a voltage at the output terminal 42), and a driving current in the cases where the positive-electrode-side output of the battery is normal (i.e., a "normal operation"), the positive-electrode-side output of the battery is in a ground fault condition (also referred to as a "ground fault"), and an overvoltage equal to or more than a rated forward voltage (Vf) of the LEDs 50-1 to 50-N is applied to the positive electrode of the battery (also referred to as an "overvoltage application"). Sections A and C indicate the case of the normal operation, section B indicates the case of the ground fault, and section D indicates the case of the overvoltage application.

In the case of the normal operation, when the battery voltage is applied to the input terminal 40, the driving voltage is supplied to the base of the NPN transistor Tr11. Since the NPN transistor Tr11 is turned on, the PMOS transistor Tr10 is also turned on, so that the driving current is supplied to the LEDs 50-1 to 50-N via the PMOS transistor Tr10 (refer to section A).

In the case of the ground fault, the driving voltage becomes almost zero volts, and a voltage capable of turning on the NPN transistor Tr11 is not generated in the base of the NPN transistor Tr11. Then, since the NPN transistor Tr11 is turned off, the PMOS transistor Tr10 is also turned off, and the driving current is in the ground fault condition via the resistor R20. Since the driving current at this time passes through the resistor R20 having a large resistor value, the current value of the driving current becomes small (refer to section B).

Subsequently, when the positive-electrode-side output terminal 42 returns from the ground fault condition to the normal condition, the driving voltage is supplied to the base of the NPN transistor Tr11 (refer to section C). Since the subsequent operation is the same as that of section A, further description is omitted.

In the case of the overvoltage application caused by a load dump or the like, since a large current is supplied as a high level signal to the base of the NPN transistor Tr12 in order to turn on the zener diode ZD2, the NPN transistor Tr12 is turned on, and the NPN transistor Tr11 is turned off. Accordingly, the PMOS transistor Tr10 is also turned off, and the driving current is supplied to the LEDs 50-1 to 50-N via the resistor R20. Since the driving current at this time passes through the resistor R20 having a large resistor value, the current value thereof becomes small (refer to section D). In addition, in the case of the overvoltage, since the current flows to the LEDs 50-1 to 50-N via the resistor R20, the driving current and the driving voltage do not completely become zero (refer to section D).

In addition, since the overvoltage has a size which is almost ten times the battery voltage, the driving voltage does not quite reach zero volts (refer to section D).

Subsequently, when the battery voltage returns to the normal condition, the NPN transistor Tr12 is turned off, and the PMOS transistor Tr10 is turned on, so that the driving voltage in the case of the normal operation is applied to the LEDs 50-1 to 50-N. The subsequent operation is the same as that of section C.

Since the setting range of the ON voltage of the NPN transistor Tr11 is the same as that of the first embodiment, further description is omitted.

According to the second embodiment, as described above, when the positive-electrode-side output terminal 42 is in the ground fault condition, the ground fault current passes through the resistor R20 having a large resistor value by turning off the PMOS transistor Tr10. Accordingly, it is possible to prevent the large ground fault current from flowing from the positive electrode to the ground, and thus to improve the safety of the vehicle in a traveling mode.

In addition, even when the overvoltage is input via the positive-electrode-side input terminal 40 of the battery, it is possible to allow a large current based on the overvoltage to pass through the resistor R20 having a large resistor value by turning off the PMOS transistor Tr10. Accordingly, it is possible to prevent a large current from flowing from the positive electrode to the LEDs 50-1 to 50-N, and thus to improve the safety of the vehicle in a traveling mode.

Although the present invention has been shown and described with reference to certain exemplary embodiments, other implementations are within the scope of the claims. Persons of ordinary skill in the art will recognize that various changes in form and details may be made therein without departing from the spirit and scope of the invention as defined by the appended claims.

What is claimed is:
1. A vehicle lamp lighting control device comprising:
a current control unit which is of a non-insulation type and is arranged to supply a supply current to a semiconductor light source;
an abnormality detecting unit arranged to detect abnormality of a positive-electrode-side output based on at least one of a power supply voltage or a supply voltage supplied to the semiconductor light source, and arranged to provide a signal indicating the abnormality; and
a bypass unit comprising a resistor connected in series with the semiconductor light source, and a switch connected in parallel with the resistor, wherein the bypass unit is arranged to pass the supply current supplied from the current control unit through the resistor by turning off the switch when the signal indicating the abnormality is received.

2. The vehicle lamp lighting control device according to claim 1, wherein the abnormality detecting unit comprises a first switch element arranged to turn off the switch when the abnormality is detected.

3. The vehicle lamp lighting control device according to claim 2, wherein the abnormality detecting unit includes an overvoltage detecting unit to detect an overvoltage of the power supply voltage, and wherein the abnormality detecting unit is arranged to turn off the switch when the overvoltage detecting unit detects the overvoltage.

4. The vehicle lamp lighting control device according to claim 2, wherein the abnormality detecting unit includes a supply voltage detecting unit to detect a decrease in the supply voltage, and wherein the abnormality detecting unit is arranged to turn off the switch when the supply voltage detecting unit detects a decrease in the supply voltage.

5. The vehicle lamp lighting control device according to claim 2, wherein the abnormality detecting unit includes a second switch element to stop a voltage supply to the semiconductor light source at substantially the same time when the switch is turned off.

* * * * *